Dec. 1, 1942.  F. W. PIERSON  2,303,757
AERATING AND COOLING DEVICE
Filed Aug. 2, 1940
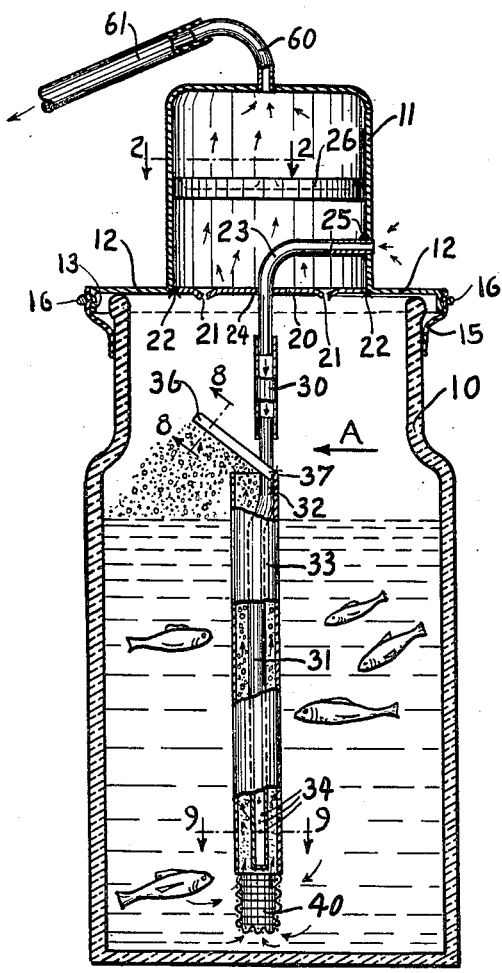
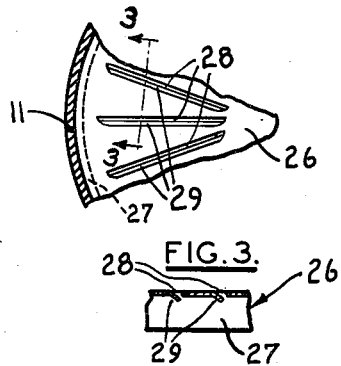
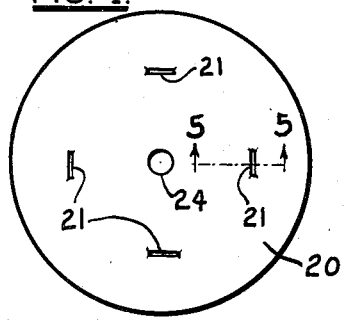
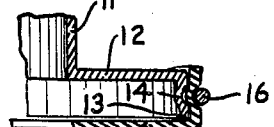
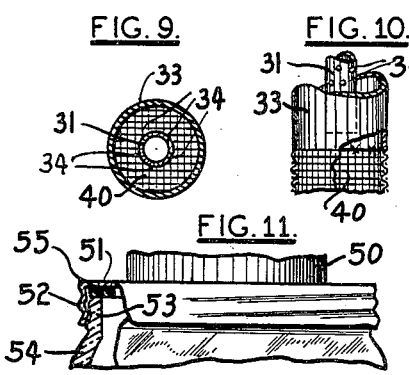
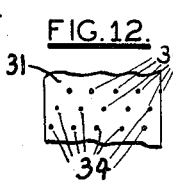
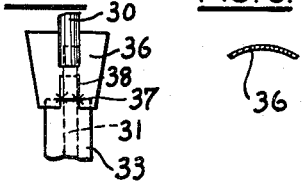
INVENTOR.
FRED W. PIERSON.
BY Thomas G. Boman
ATTORNEY.

Patented Dec. 1, 1942

2,303,757

UNITED STATES PATENT OFFICE 2,303,757

AERATING AND COOLING DEVICE

Fred W. Pierson, Grandville, Mich.

Application August 2, 1940, Serial No. 349,766

8 Claims. (Cl. 119—5)

My invention relates generally to an aerating and cooling device and more particularly to the art of keeping live bait, as minnows, in their usual healthy and lively condition whereby they serve as good bait.

The invention contemplates a container which has a single conduit for connection onto the source of energy, as, for example, the intake manifold of an automobile engine, whereby the water in the container is not only kept aerated but is also kept from undue and harmful or violent agitation and furthermore the water is cooled quite a number of degrees of temperature due to the expansion of the air stream within the confines of the container.

My invention is similar in some respects to the patent to Carpenter, No. 2,007,326, dated July 9, 1935, but differs therefrom in others, one difference being that in my device the water is actually blown upwardly along the projection chamber or tube and into the air after which it falls upon the surface of the adjacent water and entraps additional air thereinto. Thus aeration of the water is accelerated. Also, in my structure the air enters the water very close to the bottom of the projection tube and thus velocity is attained which is sufficient to cause the above described action. Also, the entering air stream is widely broken up into a number of small bubbles whereby greater effect or action is obtained for the same amount of air.

Yet another feature of my invention resides in my means for preventing entry of the minnows into the water having more or less violent action.

Yet another feature of my invention relates to the plate at the lower edge of the dome structure, this plate having four slots, these preventing rapid flow of water therethrough whereby accidental turning of the container on its side for a short time will not permit entry of water into the suction tube. Also, this plate has the slots so shaped as to prevent excessive movement of water vapor therethrough.

Also, I provide a second plate which likewise acts to catch and condense moisture thus causing it to drip back into the bottom of the container.

Additionally, it will be seen that the expansion of the air occurs within the container and it has been found that cooling of the water results, this being advantageous in the preservation of the bait.

Other objects of the invention will more fully appear from the following description and the accompanying drawing and will be pointed out in the annexed claims.

In the drawing, there has been disclosed a structure designed to carry out the objects of the invention but it is to be understood that the invention is not confined to the exact features shown as various changes may be made within the scope of the claims which follow.

In the drawing:

Fig. 1 is a sectional view showing my invention applied to a container having minnows therein.

Fig. 2 is an enlarged fragmentary view taken along the plane of the line 2—2 of Fig. 1.

Fig. 3 is a sectional view taken along the plane of the line 3—3 of Fig. 2.

Fig. 4 is a plan view of the bottom plate of the dome.

Fig. 5 is a fragmentary view taken along the plane of the line 5—5 of Fig. 4.

Fig. 6 is an enlarged fragmentary view illustrating the attachment between the flange of the dome and the rubber sealing unit.

Fig. 7 is a fragmentary elevational view looking in the direction indicated by the arrow A of Fig. 1.

Fig. 8 is a sectional view taken along the plane of the line 8—8 of Fig. 1.

Fig. 9 is a sectional view taken along the plane of the line 9—9 of Fig. 1.

Fig. 10 is a side elevation of Fig. 9, parts being broken away to expedite the showing.

Fig. 11 is a modified form of the device showing the screw type of connection between the cover or dome and the container.

Fig. 12 is an elevational view showing the pipe 31 expanded or unrolled to show the staggered positioning of the several air outlet holes.

Referring particularly to Fig. 1, numeral 10 indicates a container, which may be made of glass so that the bait, as well as water action, will be clearly visible.

The closure or cover member has an inverted cup-shape or dome member 11 with a flange 12 extending therefrom, this flange 12 resting upon the top flange or edge of the container, this edge being bent downwardly as shown at 13.

As shown in Fig. 6, the downwardly extending flange 13 is grooved at 14 and a sealing member 15, cut from a flat sheet of rubber to general annular shape, when unflexed, has its outer portion stretched up along the flange 13 and over the groove 14 and a wire 16 is stretched over the rubber and forces it into the groove to hold the sealing member in place and to provide a tight sealing fit between the rubber and the depending flange 13. The rubber sealing member 15 extends radially inwardly, as shown, and is readily grasped by the fingers of the user so that it may be extended to encircle the top of the container as shown in Fig. 1. The inwardly extending part of the sealing member 15 provides diametrical adjustability whereby the closure or cover may be tightly sealed onto a wide variety of shapes and sizes of containers.

A baffle plate 20, see Fig. 4, is of circular shape, and has four slots 21 formed therein. Each of these slots, see Fig. 5, has down-turned edges and thus any condensate or water, which may have collected above this plate, will flow downwardly through these slots. These slots are located about two-thirds outwardly of the plate. Thus the water line, in case of accidental tipping, is not far above the lower slot and also the upper slot is located above the water line whereby the suction does not act upon the water to cause it to be drawn through the slots 21.

The disk 20, see Fig. 1, may be welded into the lower end of the dome member 11, and a pipe or conduit 23 extends through the hole 24 in the disk and then curves laterally to extend through the outer dome wall into which it is sealed by welding as at 25.

A second baffle plate 26, see Figs. 1, 2 and 3, is flanged at 27 and may be press fitted into the dome member. The baffle plate has a series of slots 28, each slot being bordered by a down turned flange 29, these flanges extending angularly as shown whereby the movement of the air is such as to cause separation of the water particles with their subsequent drainage back through the slots 28.

The lower end of the pipe 23, previously referred to, extends downwardly and is connected by the flexible rubber conduit 30 onto the top of the tube 31. The tube 31 is fastened onto the larger tube or shell or chamber 33 as at 32 and thus a rigid connection is provided. The flexible conduit 30 serves as a universal joint whereby the assembly supported thereby remains vertical at all times. Thus the device will efficiently function even though the container may be angularly positioned somewhat away from the vertical.

The tube 31 is slightly offset and extends axially down into the larger projection tube 33 and small holes 34, see Figs. 1, 9 and 10, are formed near the bottom thereof. These permit the entry of air into the water and thus a large number of small bubbles are had whereby these bubbles, moving upwardly in accelerated fashion, cause substantial flow of water upwardly through the tube 33.

A shielding or deflecting plate 36, see Figs. 1, 7 and 8, is attached onto the top of the tube 33 as at 37, and extends angularly across the top of the tube 33 whereby the upcoming stream of water and air is deflected laterally and falls back onto the surface of the adjacent water thus entrapping additional air into the water and further purifying and aerating the same.

The plate 36 is curved as shown in Fig. 8 to exert maximum effect upon the water stream. The plate 36 is slotted at 38 to straddle the pipe or conduit 31.

A circular screen structure 40, of cup like shape, is welded or brazed at its top edge onto the bottom of the projection pipe 33. See Figs. 1 and 10.

Referring to Fig. 11, the dome member 50 has a flange 51 which is downturned and bent to form threads 52 to receive the threaded neck 53 of the glass bottle or other container 54, a rubber sealing washer 55 being positioned therebetween as shown. The dome member 50 has similar appurtenances to those described with relation to the dome member 11.

The dome member 11 has an outlet pipe 60 to which the suction tube 61 is attached, this leading to any source of suction.

As is shown in Fig. 12, the pipe 31 being unrolled, the holes 34 are arranged in five rows spaced around the circumference of the tube or pipe 31. And these holes 34 are in three vertically spaced rows.

It will be seen that the rows of holes are staggered whereby the bubbles from one row of holes will not coincide with those from another row of holes but will be laterally positioned therefrom whereby there will be a great number of smaller bubbles formed rather than a lesser number of the larger bubbles.

It will be understood that the holes 34 are of very small diameter, varying from perhaps a No. 80 drill up to a No. 65 drill although these limits are not definite and different sizes may be employed if suitable to produce the desired results.

The operation is readily understood. Upon provision of and attachment to a source of vacuum, as the intake manifold of an internal combustion engine, as for an automobile or a motorboat, rarefaction of the air in the dome occurs and thus the usual exterior air pressure pushes down into the pipe 31 through the pipe 23 and universal rubber tubing 30, thus causing the bubbles to emerge through the series of openings 34.

These bubbles move upwardly, carrying the water along with the same, and by the time they reach the top of this projection tube 33 they have attained sufficient velocity to cause the stream of water to strike against the deflection plate 36 and arc through the air as indicated in Fig. 1.

As indicated at the bottom of the projection tube, the screen prevents any of the minnows or the like from being drawn into the tube 33. The water enters into the tube through the screen. The arrows, see Fig. 1, indicate the flow of the water and the air as will be easily understood by those versed in this art.

The baffle plate 36 also prevents the water from surging upwardly whereby it might be drawn into or enter into the space above the plate 20 through the slots 21.

While I have described a complete embodiment of my invention, I do not wish to be limited to the particular constructions shown, my invention being in fact limited solely by the attached claims.

I claim:

1. In an aerating and cooling device, the combination of, a container partly filled with water, an air-tight lid therefor, an open ended elongated tube having its upper end above the water line and within the container, said tube extending down into the water to a point adjacent the bottom of the container, means for entering air at a plurality of openings near the bottom of the tube and for withdrawing air from the space above the water line whereby the water rises and overflows the top of the tube and means for deflecting the aerated water which egresses from the top of the tube.

2. In combination, a container having water therein, a lid having an outwardly extending flange resting upon the top edge of the container, an annular rubber connecting member having a relatively thin flange extending inwardly but capable of being axially deflected to tight engagement with the outer top edge of the container, a vertically positioned open ended tube within the container, the tube extending to above the water line. means for feeding air into the bottom of the tube, means for withdrawing air from above the water line, deflecting means above the tube and screen means around the bottom end of the said tube.

3. In combination, a container, a cover having a dome portion, sealing means therebetween, an outlet pipe leading from the said dome, an inlet pipe leading through the dome and extending down into the container, said inlet pipe terminating near the bottom of the said container, a tube extending around the said inlet pipe and from therebelow to a point above the water line of the water which is placed within the container, baffle means for restricting some of the water particles from passing into the upper part of the dome and a plate located at the bottom of the dome, said plate having a plurality of slots located therein.

4. A combination of elements as set forth in claim 3 in which an angularly positioned deflector plate is fastened onto the said tube to extend over the upper end thereof.

5. A combination of elements as set forth in claim 3 in which a deflector plate is provided over the said tube and screen means is located therebelow.

6. In a device of the character described, a closed receptacle, an air exhausting connection leading into the top of the said receptacle, an elongated vertically-positioned projection chamber having its ends open and being positioned with its lower end adjacent the bottom of the receptacle and its upper end above the water line of the water which is placed in the said receptacle, the upper portion of the said receptacle being unrestricted whereby the amount of vacuum is stabilized and equalized over the entire water surface, and an inlet tube from the atmosphere leading into the lower portion of the said projection chamber, said inlet tube having a plurality of discharge openings located in the projection chamber below the water line and closely adjacent the bottom of the receptacle.

7. In combination, a closed receptacle adapted to contain water, water partly filling the same, an outlet leading from the top thereof, a projection chamber vertically positioned within the receptacle, said chamber having its top end spaced from the top of the receptacle, a deflector plate located between said top end and the top of the receptacle and being closely adjacent the top end of the projection chamber, the structure permitting the entry of water into the bottom of the projection chamber, and an air inlet leading into the bottom of the projection chamber, said water line within the receptacle immediately adjacent the projection chamber being only slightly below the top end thereof whereby entry of air through the air inlet causes impingement of water upwardly against the said deflector plate.

8. In combination, a container, a cover having a dome portion, sealing means therebetween, an outlet pipe leading from the said dome, an inlet pipe leading through the dome and extending down into the container, said inlet pipe terminating near the bottom of the said container, a tube extending around the said inlet pipe and from therebelow to a point above the water line of the water which is placed within the container, said tube being fastened to and carried by the said inlet pipe and baffle means carried by the upper portion of the said tube and extending laterally thereacross but in spaced relationship thereto whereby upward flow of water through the pipe may be deflected from its vertical movement for the purpose described.

FRED W. PIERSON.